United States Patent
Plant

(10) Patent No.: US 8,543,251 B2
(45) Date of Patent: Sep. 24, 2013

(54) CENTRALIZED FINE GRADE CONTROL OF DEVICE ENERGY CONSUMPTION

(75) Inventor: Laurence J. Plant, North Balwyn (AU)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 12/973,141

(22) Filed: Dec. 20, 2010

(65) Prior Publication Data
US 2012/0158199 A1    Jun. 21, 2012

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G01R 21/06 | (2006.01) |
| G01R 19/00 | (2006.01) |
| G08B 1/08 | (2006.01) |
| G08B 21/00 | (2006.01) |
| H04M 11/04 | (2006.01) |
| H04Q 1/30 | (2006.01) |

(52) U.S. Cl.
USPC ............ 700/298; 700/291; 700/295; 702/60; 702/64; 340/538; 340/660

(58) Field of Classification Search
USPC ............... 307/11, 38–40; 340/500, 531, 533, 340/538, 540, 541, 657, 660, 679; 700/286, 700/291, 292, 295–298; 702/1, 57, 58, 60–62, 702/64, 65, 79
See application file for complete search history.

(56) References Cited

U.S. PATENT DOCUMENTS

| | | | |
|---|---|---|---|
| 7,034,707 B2 * | 4/2006 | Aisa ............................. | 340/662 |
| 7,081,827 B2 | 7/2006 | Addy | |
| 7,598,702 B2 | 10/2009 | Walrath | |
| 7,706,392 B2 | 4/2010 | Ghoshal et al. | |
| 7,711,814 B1 | 5/2010 | Emerick et al. | |
| 7,906,869 B2 * | 3/2011 | Lee et al. ......................... | 307/40 |
| 8,027,752 B2 * | 9/2011 | Castaldo et al. .............. | 700/296 |
| 8,290,635 B2 * | 10/2012 | Cohen ........................... | 700/295 |
| 2007/0079159 A1 | 4/2007 | Wong et al. | |
| 2008/0201595 A1 | 8/2008 | Kawasaki | |
| 2009/0192927 A1 | 7/2009 | Berg et al. | |
| 2009/0235107 A1 | 9/2009 | Gelonese | |
| 2010/0141442 A1 * | 6/2010 | Matsuyama et al. ........... | 340/541 |
| 2010/0191487 A1 * | 7/2010 | Rada et al. ...................... | 702/60 |
| 2011/0153246 A1 * | 6/2011 | Donaldson et al. ............. | 702/65 |
| 2011/0288905 A1 * | 11/2011 | Mrakas ........................ | 705/7.25 |
| 2011/0313582 A1 * | 12/2011 | van Megen et al. ........... | 700/292 |
| 2012/0123995 A1 * | 5/2012 | Boot .............................. | 706/54 |

FOREIGN PATENT DOCUMENTS

| | | |
|---|---|---|
| JP | 59218527 A | 12/1984 |
| WO | 0024109 A1 | 4/2000 |

* cited by examiner

Primary Examiner — Crystal J Barnes-Bullock
(74) Attorney, Agent, or Firm — Andrea Bauer; Hoffman Warnick LLC

(57) ABSTRACT

Aspects of the present invention provide a solution for controlling electricity to a device. A sensor is associated with a device that is independently coupled to an electricity distribution network. The sensor senses electricity usage for the device. Based on the sensed electricity usage for the device, an electricity usage pattern is identified for the device. This electricity usage pattern is used to identify a classification of the device. Based on this device classification the supply of electricity to the device can be controlled as needed by the provider.

20 Claims, 3 Drawing Sheets

CENTRALIZED FINE GRADE CONTROL OF DEVICE ENERGY CONSUMPTION

FIELD OF THE INVENTION

The subject matter of this invention relates generally to energy conservation. More specifically, aspects of the present invention provide a system and method for controlling energy consumption of an electrical device from a central source.

BACKGROUND OF THE INVENTION

Electricity is an important ingredient of modern existence. Many of the devices that we use for life, productivity, and/or entertainment are powered by electricity. FIG. 1 shows an embodiment of an electricity distribution environment 10. As shown, the supply of electricity 12 is controlled from a central location, such as electrical plant 22. From electrical plant 22, electricity 12 is distributed via a distribution network 20, to consumers, such as house 32, office 34 and factory 36. Currently, distribution of electricity 12 is largely based on customer demand.

Demand-based distribution introduces several challenges to the distribution of electricity 12. Because demand is not constant for customers, the amount of electricity that electrical plant 22 must distribute is variable. For example, overall usage of electricity 12 during nighttime hours, when most people are sleeping, may be significantly different from daytime demand.

To account for this variability, electrical plants 22 must be adapted to provide a lower amount of electricity when there is less demand and a greater amount of electricity when there is greater demand. Even so, there may be times when demand reaches a point beyond which electrical plant 22 cannot meet it. For example, in case of very high daytime temperatures, increased usage of electricity 12 by air conditioners may cause a "spike" that places so much additional load on distribution network 20 that sufficient electricity 12 cannot be supplied by electrical plant 22.

Electrical plants 22 currently attempt to deal with spikes in a variety of ways. For example, electrical plant 22 may cease providing electricity 12 to a particular customer or subset of customers, such as house 32, for a particular period of time. Often these secessions of service, called "brownouts" are applied to a particular region for a period of time and then rotated to other regions for as long as the spike occurs. However, one shortcoming of the use of brownouts to ration electricity is that there is no way to determine who can and who cannot do without electricity for a particular period of time. For example, denial of electricity 12 may be dangerous or even deadly in certain cases, such as for the elderly during a heat wave or for those who depend on medical devices that run on electricity.

SUMMARY OF THE INVENTION

In general, aspects of the present invention provide a solution for controlling electricity to a device. A sensor is associated with a device that is independently coupled to an electricity distribution network. The sensor senses electricity usage for the device. Based on the sensed electricity usage for the device, an electricity usage pattern is identified for the device. This electricity usage pattern is used to identify a classification of the device. Based on this device classification the supply of electricity to the device can be controlled as needed by the provider.

A first aspect of the invention provides a system for controlling electricity to a device, comprising: a sensor, associated with a single device that senses electricity usage for the device, the device being independently coupled to an electricity distribution network; an analyzer that identifies an electricity usage pattern for the device, based on the electricity usage of the device; a determinator that determines, based on the electricity usage pattern, a classification of the device; and a controller that controls a supply of electricity to the device based on the classification. A further aspect of the invention is where the controller controls a supply of electricity to the device by substantially ceasing to provide electricity to the device based on the classification.

A second aspect of the invention provides a method for controlling electricity to a device, comprising: sensing electricity usage for a single device, the device being independently coupled to an electricity distribution network; identifying an electricity usage pattern for the device, based on the electricity usage of the device; determining, based on the electricity usage pattern, a classification of the device; and controlling a supply of electricity to the device based on the classification. A further aspect of the invention is where the supply of electricity to the device is controlled by substantially ceasing to provide electricity to the device based on the classification.

A third aspect of the invention provides a computer program product embodied in a computer readable medium for implementing a method for controlling electricity to a device, the method comprising: sensing electricity usage for a single device, the device being independently coupled to an electricity distribution network; identifying an electricity usage pattern for the device, based on the electricity usage of the device; determining, based on the electricity usage pattern, a classification of the device; and controlling a supply of electricity to the device based on the classification. A further aspect of the invention is where the supply of electricity to the device is controlled by substantially ceasing to provide electricity to the device based on the classification.

A fourth aspect of the present invention provides a method for deploying an application for controlling electricity to a device, comprising, providing a computer system operable to: sense electricity usage for a single device, the device being independently coupled to an electricity distribution network; identify an electricity usage pattern for the device, based on the electricity usage of the device; determine, based on the electricity usage pattern, a classification of the device; and control a supply of electricity to the device based on the classification. A further aspect of the invention is where the supply of electricity to the device is controlled by substantially ceasing to provide electricity to the device based on the classification.

Still yet, any of the components of the present invention could be deployed, managed, serviced, etc., by a service provider who offers to control electricity to a device.

Embodiments of the present invention also provide related systems, methods and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
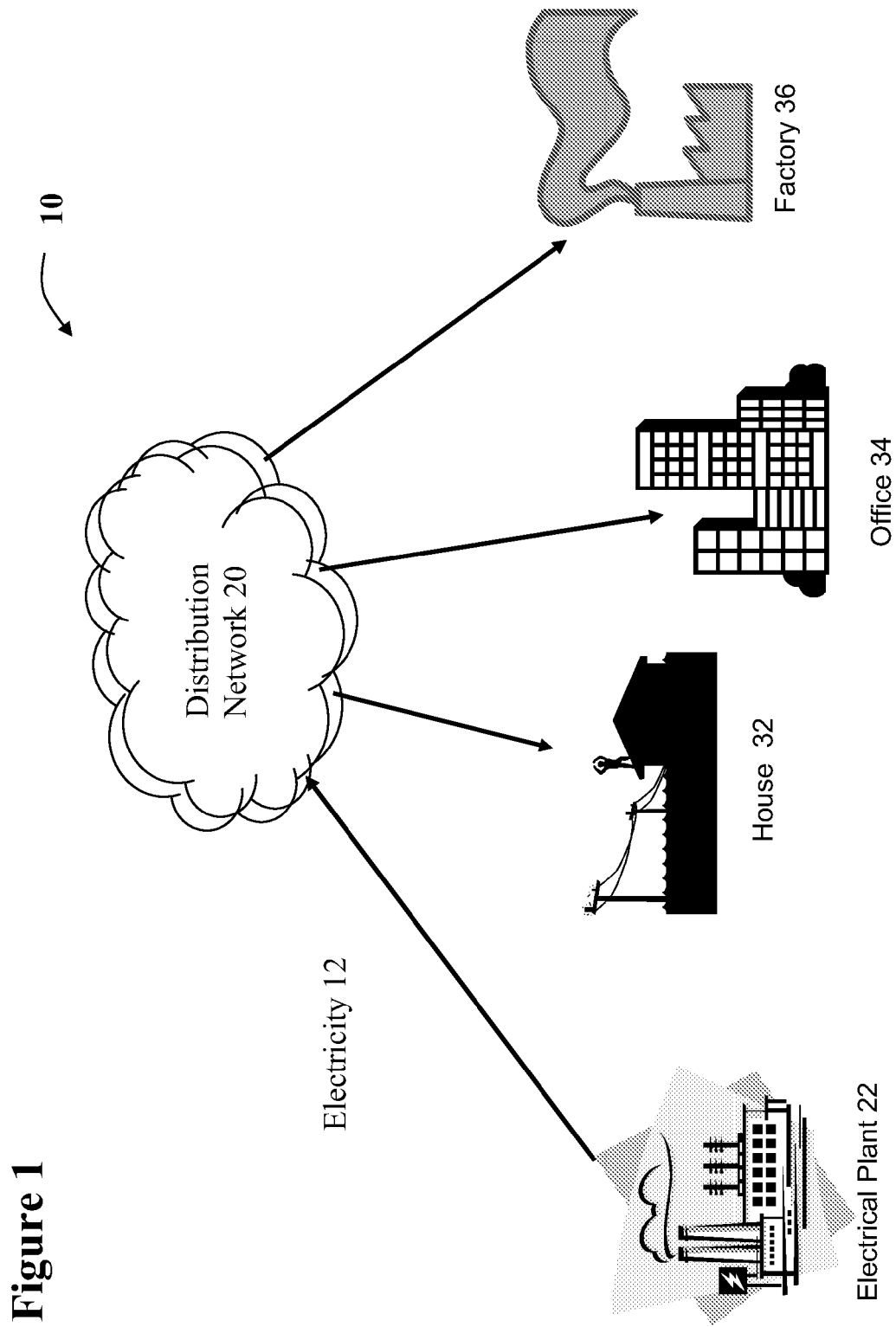
FIG. 1 shows an electricity distribution environment.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, aspects of the present invention provide a solution for controlling electricity to a device. A sensor is associated with a device that is independently coupled to an electricity distribution network. The sensor senses electricity usage for the device. Based on the sensed electricity usage for the device, an electricity usage pattern is identified for the device. This electricity usage pattern is used to identify a classification of the device. Based on this device classification the supply of electricity to the device can be controlled as needed by the provider.

Figure 2:
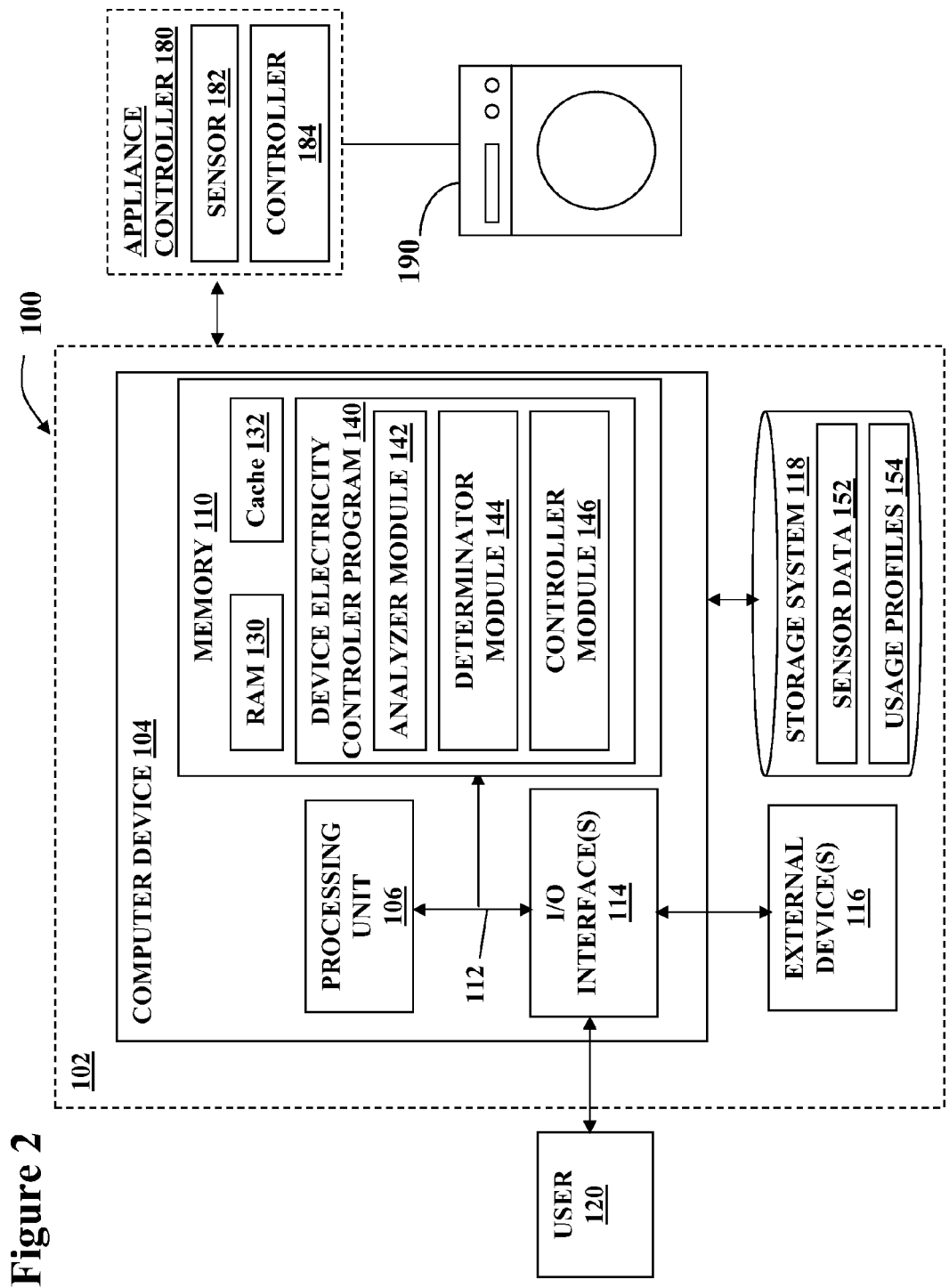
FIG. 2 shows a data processing system suitable for implementing an embodiment of the present invention.

Turing to the drawings, FIG. 2 shows an illustrative environment 100 for controlling electricity to a device 190. To this extent, environment 100 includes a computer system 102 that can perform a process described herein in order to control electricity to a device 190. In particular, computer system 102 is shown including a computing device 104 that includes a device electricity controller program 140, which makes computing device 104 operable to control electricity to a device 190 by performing a process described herein.

Computing device 104 is shown including a processing unit 106 (e.g., one or more processors), a memory 110, a storage system 118 (e.g., a storage hierarchy), an input/output (I/O) interface component 114 (e.g., one or more I/O interfaces and/or devices), and a communications pathway 112. In general, processing unit 116 executes program code, such as device electricity controller program 140, which is at least partially fixed in memory 110. Memory 110 can also include local memory (RAM 130) employed during actual execution of the program code, bulk storage (storage 118), and cache memories (cache 132) which provide temporary storage of at least some program code in order to reduce the number of times code must be retrieved from bulk storage 118 during execution. While executing program code, processing unit 106 can process data, which can result in reading and/or writing transformed data from/to memory 110 and/or I/O component 114 for further processing. Pathway 112 provides a direct or indirect communications link between each of the components in computer system 102. I/O interface component 114 can comprise one or more human I/O devices, which enable a human user 120 to interact with computer system 102 and/or one or more communications devices to enable a system user 120 to communicate with computer system 102 using any type of communications link.

To this extent, device electricity controller program 140 can manage a set of interfaces (e.g., graphical user interface (s), application program interface, and/or the like) that enable human and/or system users 120 to interact with device electricity controller program 140. Further, device electricity controller program 140 can manage (e.g., store, retrieve, create, manipulate, organize, present, etc.) the data, such as sensor data 152 and/or usage profiles 154, using any solution.

In any event, computer system 102 can comprise one or more general purpose computing articles of manufacture 104 (e.g., computing devices) capable of executing program code, such as device electricity controller program 140, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, device electricity controller program 140 can be embodied as any combination of system software and/or application software. In any event, the technical effect of computer system 102 is to provide processing instructions to computing device 104 in order to control electricity to a device 190.

Further, device electricity controller program 140 can be implemented using a set of modules 142-146. In this case, a module 142-146 can enable computer system 102 to perform a set of tasks used by device electricity controller program 140, and can be separately developed and/or implemented apart from other portions of device electricity controller program 140. As used herein, the term "component" means any configuration of hardware, with or without software, which implements the functionality described in conjunction therewith using any solution, while the term "module" means program code that enables a computer system 102 to implement the actions described in conjunction therewith using any solution. When fixed in a memory 110 of a computer system 102 that includes a processing unit 106, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 102.

When computer system 102 comprises multiple computing devices 104, each computing device 104 can have only a portion of device electricity controller program 140 fixed thereon (e.g., one or more modules 142-146). However, it is understood that computer system 102 and device electricity controller program 140 are only representative of various possible equivalent computer systems that may perform a process described herein. To this extent, in other embodiments, the functionality provided by computer system 102 and device electricity controller program 140 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 102 includes multiple computing devices 104, the computing devices can communicate over any type of communications link. Further, while performing a process described herein, computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, device electricity controller program 140 enables computer system 102 to control electricity to a device 190. To this extent, device electricity controller program 140 is shown including an analyzer module 142, a determinator module 144, and a controller module 146.

Referring again to FIG. 2 computer system 102 (e.g., analyzer module 142) analyses sensor data 152 from a sensor 182 regarding electricity usage for device 190 to identify an electricity usage pattern for the device. To this extent, sensor 182 is associated with device 190, and operates to sense electricity usage for device 190. In one embodiment of the invention device 190 is intended to represent, an electrical apparatus is independently coupled to an electricity distribution network 20 (FIG. 1), and not merely a component in such a device. To this extent, device 190, in this embodiment is a stand-alone apparatus that can be turned on or off independently of any other device 190 and to which electricity can be supplied independently of any other device. Examples of such devices can have classifications that include, but not be limited to: large appliances, such as refrigerators, stoves, microwave ovens, washing machines, or clothes dryers; small appliances, such as toasters, blenders, mixers, or crock pots; electronic devices, such as televisions, radios, audio players, video players or computers; climate control devices, such as central air conditioners, portable air-conditioners, central heaters, or portable heaters; medical devices, such as oxygen pumps or dialysis machines; lighting; or any other device which may be independently coupled to electricity distributing network.

Also associated with device 190 is a controller 184. As shown, sensor 182 and controller 184 are both included within an appliance controller 180. As such, sensor 182 and controller 184 can be components of a single appliance controller 180 device. Alternatively, sensor 182 and controller 184 could comprise a plurality of separate devices that operate in tandem as appliance controller 180 to control electricity to device 190.

Figure 3:
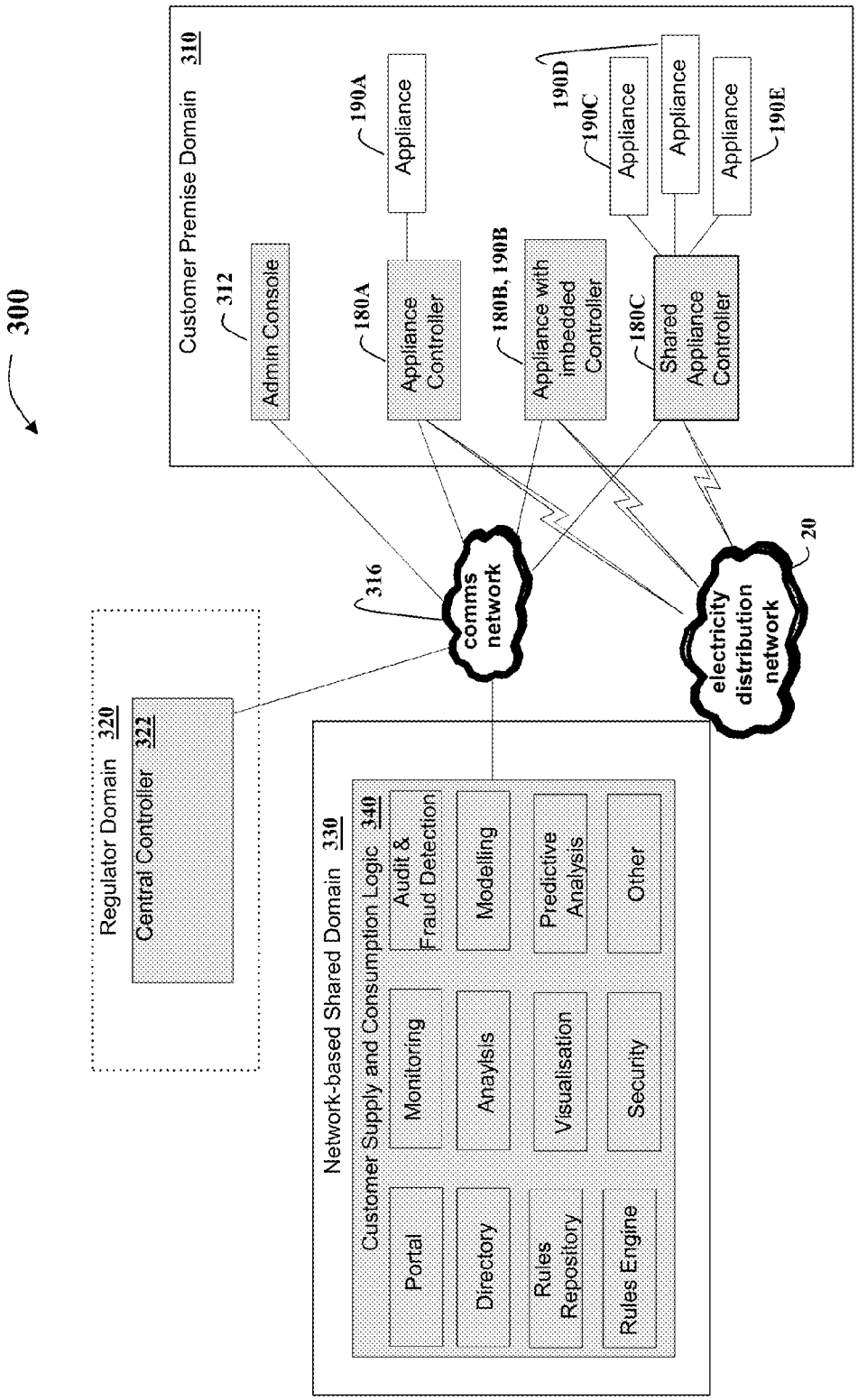
FIG. 3 shows an illustration of possible domains according to an embodiment of the invention.

Turning now to FIG. 3, an illustration showing an environment 300 for controlling electricity to a device 190 according to an embodiment is provided. As illustrated, environment 300 can include a plurality of domains in which the functions of the invention can be performed, including, a customer premise domain 310, a regulator domain 320, and a network-based shared domain 330. Although shown as three separate domains, it should be recognized that alternative quantities and types of domains may be envisioned. For example, functions of network-based shared domain can be performed at one of the other domains, such as customer premise domain 310, etc. Alternatively, functions illustrated as being performed at a single domain may be spread among one or more existing domains or a new domain may be created for performing a subset of the functions of one or more of the illustrated domains.

In any case, customer domain 310 encompasses a physical location for which a particular customer, such as user 120 (FIG. 2) is responsible for use of electricity. To this extent, customer domain can be a single family dwelling or apartment; an apartment building, complex, or group of complexes; an office space, building, complex or group of complexes; an industrial space, building, complex or group of complexes, etc. In any case, as illustrated, in FIG. 3, customer domain 310 includes one or more devices (in this case, appliances) 190A-190E and one or more appliance controllers 180A-180C corresponding to the devices. As shown, an appliance controller can be imbedded within a device as with appliance 190B with imbedded controller 180B. Conversely, an appliance controller can be associated with a single device 190A, such as appliance controller 180A. In such an embodiment, appliance controller 180A can be located within an electrical outlet to which device 190A is plugged in, can include a device that is plugged into an outlet and which device 190A is plugged in, can be located along the wiring between the outlet and a point (such as the junction box) of customer domain 310 at which the wire separates from other wires, etc. In yet another embodiment, an appliance controller can be associated with a plurality of devices 190C-E, as with appliance controller 180C. In this embodiment, appliance controller 180C can be located within, or used in conjunction with an electrical power strip, can be a part of a point (such as the electrical junction box) of customer domain 310 at which wires separate from each other, can be located at the meter, etc.

Whatever the case, sensor 182 of appliance controller 180 senses electricity usage for device 190. In doing so, sensor 182 may sense the amount of time during which electricity is used, e.g., whether there are cycles during which device 190 is using electricity and other cycles during which no electricity is being used, or whether device 190 is using electricity constantly. Furthermore, sensor 182 can sense the amount of electricity used by device 190 and whether this amount fluctuates over time.

As stated above, analyzer module 142 analyses the electricity usage of device 190 provided by sensor 182 and identifies an electricity usage pattern for the device from the data. To this extent, all or a portion of analyzer module 142 can be co-located with sensor 182. In the alternative, all or a portion of analyzer module 142 can be located at another domain, such as network based shared domain 330 (FIG. 3). In this case, sensor 182 can communicate all or a portion of the sensed data to analyzer module 142 for analysis. For example, sensor 182 could relay streaming data that indicates in real time the electricity usage for device 190. Alternatively, sensor 182 could relay data only when conditions change, such as when electricity usage begins or ends for device 190 or when the amount of electricity used changes. Still further, sensor 182 could accumulate data over a predetermined time period and relay (e.g., periodically) a summary of the data received over that period.

Returning again to FIGS. 2 and 3 in combination, electricity usage of device 190 sensed by sensor 182 can be relayed to analyzer module 142 by a communications network 316. Communications network 316 transports sensor data and control signals (which will be described hereafter), as well as other information, between domains 310, 320, 330, such as between appliance controllers 180A-C and a central controlling location. To this extent, communications network 316 could include one or a combination of: a wireless network, with each appliance controller 180A-C having a wireless network connection; fixed, with each appliance controller 180A-C being connected to a local Ethernet, which is in turn connected to a wide area network, such as the Internet; broadband over electricity distribution network 20; and/or any other communications solution new known or later developed. As communications over communications network 316 may be necessary during power outages, it would be advantageous for communications network 316 to remain operational during periods of controlled outage.

Referring again to FIG. 2 computer system 102 (e.g., determinator module 144) determines a classification of device 190, based on the electricity usage pattern identified by analyzer module 142. In doing so, determinator module 144 can access usage profiles 154 and compare the usage pattern from device 190 to usage profiles 154 of known classifications of devices. For example, the usage profile 154 for a generic refrigerator could indicate a large usage of electricity for a time period of several minutes followed by a lengthy period of inactivity. Supposing that the electricity usage pattern for device 190 followed this pattern, device 190 could be classified as a refrigerator type device. Furthermore, usage profiles 154 could further distinguish characteristics that differ between devices of the same type, allowing determinator module 144 to determine not only the type of device, but also the make and model.

Still further, determinator module 144 could also make a determination as to whether device 190 is operating correctly. In performing this function, determinator module 144 could compare a recent electricity usage pattern with previous electricity usage patterns of the device to determine whether there has been a deviation that indicates a malfunction. In addition or in the alternative, a comparison can be made between the recent electricity usage pattern and the usage profile 154 used to classify device 190 to determine whether there is a substantial variance between the two.

Once determinator module 144 has determined the classification for device 190, computer system 102 (e.g., controller module 146) controls the supply of electricity to device 190 based on the classification. Specifically, controller module 146 can cause controller 184 to substantially cease to provide electricity to specific device 190. The determination to cause this ceasing of electricity supply is based on the classification of device determined by determinator module 144. In this way, electricity can be continued to be provided to high priority devices even in times of electricity shortage, while being automatically ceased for devices that are lower priority. In making this determination, controller module 146 can use a set of priority rules that are set by rule setters, including, electrical plant 22 (FIG. 1); a regulator, such as a governmental entity, in regulator domain 320 (FIG. 3); and/or user 120 as a way of prioritizing his/her own electricity needs. In this way, user 120 can, in an embodiment, come to an agreement with a controlling entity as to electricity use. For example, user 120 may receive a reduced rate or discount of some sort in exchange for agreeing to forego electricity to a portion of its devices 190 during times of peak electricity use. The terms of this agreement can then be monitored enforced automatically using the teachings of the current invention.

Returning again to FIGS. 2 and 3, concurrently, suppose, for example, device 190B is a clothes dryer and device 190A is a medical device. Further suppose that the priority rules indicate that in a summer heat-wave induced shortage, devices having the classification of clothes dryer have low priority while devices having the classification of medical devices have high priority. Central controller 322, could notify controller 184 of appliance controller 180B associated with device 190B of the classification of clothes dryer to cease providing electricity to device 190B. Electricity could then be ceased to be provided to device 190B, while continuing to be provided to device 190A. Alternatively, devices 190 of the same classification could be treated differently based on characteristics of the respective users 120. For example, the priority rules could indicate that devices 190 having the classification of air-conditioner are high priority if user 120 is elderly or infirm and low otherwise; or the device 190 having the classification of refrigerator have a higher priority for stores selling meat or ice cream than in the general population.

In controlling the supply of electricity to device 190, controller module 146 can utilize an interface, such as customer supply and consumption logic 340. Customer supply and consumption logic 340 can be deployed as a single instance for user 120, or, in the alternative, can be shared by multiple users 120. Furthermore, customer supply and consumption logic 340 can be located entirely or in part in customer premise domain 310, or, in the alternative, can be located remotely, such as in a networked environment. In this case, customer supply and consumption logic 340 can be accessed by user 120 via an admin console 312. As such, customer supply and consumption logic 340 can include, for example, one or more of the following components:

a portal user interface which provides presentation services for use by consumers in different domains including but not limited to a business spread across multiple sites, a multi-tenanted building comprising multiple hosted businesses, a hospital, an industrial park, an apartment block, a domestic dwelling, etc;

a directory of devices 190A-E, appliance controllers 180A-C, users 120 (such as individuals or hospitals) who own or have a right to use the device and policy entities (such as governmental entities, a landlord or user 120) who have a right to set rules for electricity consumption;

security regimes for identifying, authenticating and authorizing users 120 and appliance controllers 180A-C;

monitoring aggregations of actual consumption records and patterns provided by each appliance controller 180A-C;

audit and fraud detection capability including pattern matching algorithms to identify whether the actual electricity consumption of device 190A-E matches the profile of consumption for the device;

rules repository stores policy rules set by policy entities. These may include broad rules for the entire community, such as those set by a supplier or a governmental entity, and/or rules set by user 120, specifying a priority for devices 190 to be maintained in case of an emergency;

rules engine which makes decisions on control of supply of electricity based on electricity supply, priority rules, user characteristics, and device classification and for determining instructions to be forwarded to appliance controllers 180A-C;

modeling simulations that enable operators and external entities to perform test based on different scenarios to plan capability;

predictive analysis, which incorporates event data received from a wide range of input, such as weather forecasts and historic seasonal consumption patterns and predicts, or forecasts, patterns of electricity consumption likely to occur over a particular period of time; and visualization performs tools that allow operators to be informed quickly regarding any current issues and/or events and what actions are being taken to address them.

To this extent, customer supply and consumption logic 340 can be used to tailor control of electricity to one or more devices 190A-C to the specific need of a particular user 120 and/or policy entity. For example, user 120 can use customer supply and consumption logic 340 to make, modify and/or verify terms of an agreement with a controlling entity as to electricity use, such as the agreement referenced above in which user 120 receives a reduced rate or discount of some sort in exchange for agreeing to forego electricity to a portion of its devices 190A-C during times of peak electricity use. Similarly, in an embodiment, user 120 can use customer supply and consumption logic 340 to direct one or more appliance controllers 180A-C to restore power to a necessary device 190A-C. For example, user 120 could access customer supply and consumption logic 340 via admin console 312 to submit data to via customer supply and consumption logic 340 that may be germane to the priority of devices, including, but not limited to the age of user 120, an updated classification of device 190A-C, and/or a business type of user 120. Further, in an embodiment in which device controller 180A-C automatically switches off power to devices 190A-C that have been in standby mode for a predetermined period of time (eg Plasma TVs and DVD players that have not been used for 2 hours), user 120 could use customer supply and consumption logic 340 to access customer supply and consumption logic 340 to restore power to the devices 190A-C.

While shown and described herein as a method and system for configuring software for an electric meter, it is understood that aspects of the invention further provide various alternative embodiments. For example, in one embodiment, the invention provides a computer program fixed in at least one computer-readable medium, which when executed, enables a computer system to configuring software for an electric meter. To this extent, the computer-readable medium includes program code, such as device electricity controller program 140 (FIG. 2), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as device electricity controller program 140 (FIG. 2), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for configuring software for an electric meter. In this case, a computer system, such as computer system 102 (FIG. 2), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "approximately" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to approximately 25 wt %, or, more specifically, approximately 5 wt % to approximately 20 wt %", is inclusive of the endpoints and all intermediate values of the ranges of "approximately 5 wt % to approximately 25 wt %," etc).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

I claim:

1. A system for controlling electricity to a device, comprising:
a sensor, associated with a single device that senses electricity usage for the device, the device being independently coupled to an electricity distribution network;
an analyzer that identifies an electricity usage pattern for the device, based on the electricity usage of the device from the sensor;
a determinator that determines, based on the electricity usage pattern, a classification of the device; and
a controller that controls a supply of electricity to the device based on the classification,
wherein the analyzer and the determinator are located distant from the sensor and at a central location of an electrical plant, and wherein the central location issues directives, based on the analysis and determination, to the controller.

2. The system of claim 1, wherein the controller controls the supply of electricity by substantially ceasing to provide electricity to the device.

3. The system of claim 2 further comprising:
a second sensor that senses electricity usage for a second device, the second device being independently coupled to an electricity distribution network and being independent of the device; and
a second controller that continues to provide electricity to the second device based on a second classification while the controller is substantially ceasing to provide electricity to the device based on the classification,
wherein the analyzer identifies an electricity usage pattern for the second device, based on the electricity usage of the second device, and
wherein the determinator determines, based on the electricity usage pattern, the second classification of the second device, the second classification being different from the classification of the device.

4. The system of claim 1 wherein the classification includes a device type and a device model.

5. The system of claim 1 further comprising a communicator that communicates the electricity usage to the analyzer.

6. The system of claim 1, wherein the sensor is located at least one of: in the device, along a connection between the device and an electrical wall socket; in the wall socket; along a connection between the wall electrical socket and a junction box, or in the junction box.

7. The system of claim 1 further comprising a troubleshooter that determines that the device is malfunctioning based on a previously determined classification of the device and a current electricity usage pattern for the device.

8. A method for controlling electricity to a device, comprising:
sensing electricity usage for a single device, the device being independently coupled to an electricity distribution network;

identifying an electricity usage pattern for the device, based on the electricity usage of the device;

determining, based on the electricity usage pattern, a classification of the device;

issuing directives, based on the analysis and the determination, to a controller, and controlling, by the controller, a supply of electricity to the device based on the directives, wherein the identifying, the determining, and the issuing are performed remotely from the sensing and at a central location of an electrical plant.

9. The method of claim 8, wherein the controlling includes substantially ceasing to provide electricity to the device.

10. The method of claim 9, further comprising:

sensing electricity usage for a second device, the second device being independently coupled to an electricity distribution network and being independent of the device;

identifying an electricity usage pattern for the second device, based on the electricity usage of the second device, and determining, based on the electricity usage pattern, a second classification of the second device, the second classification being different from the classification of the device, continuing to provide electricity to the second device based on the second classification while substantially ceasing to provide electricity to the device based on the classification.

11. The method of claim 8 wherein the classification includes a device type and a device model.

12. The method of claim 8 further comprising communicating the electricity usage to a central location.

13. The method of claim 8, wherein the sensor is located at least one of: in the device, along a connection between the device and an electrical wall socket; in the wall socket; along a connection between the electrical wall socket and a junction box, or in the junction box.

14. The method of claim 8, further comprising determining whether the device is malfunctioning based on a previously determined classification of the device and a current electricity usage pattern for the device.

15. A computer program product embodied in a computer readable medium for implementing a method for controlling electricity to a device, the method comprising:

sensing electricity usage for a single device, the device being independently coupled to an electricity distribution network;

identifying an electricity usage pattern for the device, based on the electricity usage of the device;

determining, based on the electricity usage pattern, a classification of the device; and issuing directives, based on the analysis and the determination, to a controller, and controlling by the controller, a supply of electricity to the device based on the directives, wherein the identifying, the determining, and the issuing are performed remotely from the sensing and at a central location of an electrical plant.

16. The computer program product of claim 15, wherein the controlling includes substantially ceasing to provide electricity to the device.

17. The computer program product of claim 16, further comprising:

sensing electricity usage for a second device, the second device being independently coupled to an electricity distribution network and being independent of the device;

identifying an electricity usage pattern for the second device, based on the electricity usage of the second device, and determining, based on the electricity usage pattern, a second classification of the second device, the second classification being different from the classification of the device, continuing to provide electricity to the second device based on the second classification while substantially ceasing to provide electricity to the device based on the classification, wherein the descriptive resource data comprises at least one physical resource location data, and further wherein the method further comprises creating floor plan of a room in which the at least one physical resource is located showing location of the at least one physical resource within the room.

18. The computer program product of claim 15, further comprising communicating the electricity usage to a central location.

19. The computer program product of claim 15, wherein the sensor is located at least one of: in the device, along a connection between the device and an electrical wall socket; in the wall socket; along a connection between the electrical wall socket and a junction box, or in the junction box.

20. The computer program product of claim 15, further comprising determining whether the device is malfunctioning based on a previously determined classification of the device and a current electricity usage pattern for the device.

\* \* \* \* \*